United States Patent
Emori

(10) Patent No.: US 8,237,958 B2
(45) Date of Patent: Aug. 7, 2012

(54) PATH DETECTING SERVER, CLIENT APPARATUS, PATH DETECTING SYSTEM, PATH DETECTING METHOD, AND COMPUTER PROGRAM PRODUCT

(75) Inventor: Mototsugu Emori, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 1243 days.

(21) Appl. No.: 11/898,976

(22) Filed: Sep. 18, 2007

(65) Prior Publication Data

US 2008/0068649 A1 Mar. 20, 2008

(30) Foreign Application Priority Data

Sep. 19, 2006 (JP) .................................. 2006-253288
Jul. 25, 2007 (JP) .................................. 2007-193878

(51) Int. Cl.
*G06F 3/12* (2006.01)
*G06K 15/00* (2006.01)
(52) U.S. Cl. ...................... 358/1.15; 358/1.13; 358/1.16
(58) Field of Classification Search .................. None
See application file for complete search history.

(56) References Cited

U.S. PATENT DOCUMENTS

| 6,452,692 B1* | 9/2002 | Yacoub | 358/1.15 |
|---|---|---|---|
| 7,167,258 B2 | 1/2007 | Yamamoto | |
| 7,372,589 B2 | 5/2008 | Ohara | |
| 2001/0007599 A1* | 7/2001 | Iguchi et al. | 382/274 |
| 2001/0052995 A1* | 12/2001 | Idehara | 358/1.15 |
| 2002/0059489 A1 | 5/2002 | Davis et al. | |
| 2003/0231331 A1* | 12/2003 | Tanaka | 358/1.13 |
| 2004/0160623 A1 | 8/2004 | Strittmatter et al. | |
| 2004/0184074 A2* | 9/2004 | Leiman et al. | 358/1.15 |
| 2005/0206917 A1* | 9/2005 | Ferlitsch | 358/1.5 |
| 2006/0139679 A1* | 6/2006 | Barry et al. | 358/1.13 |

FOREIGN PATENT DOCUMENTS

| DE | 44 22 619 | 1/1995 |
|---|---|---|
| EP | 1 450 515 | 8/2004 |
| JP | 07-072993 | 3/1995 |
| JP | 7-121478 | 5/1995 |
| JP | 11-154065 | 6/1999 |
| JP | 2001-117736 | 4/2001 |

(Continued)

OTHER PUBLICATIONS

Office Action dated Oct. 25, 2011 issued in corresponding Japanese Application No. 2007-193878.

(Continued)

*Primary Examiner* — King Poon
*Assistant Examiner* — Ming Hon
(74) *Attorney, Agent, or Firm* — Harness, Dickey & Pierce

(57) ABSTRACT

A client transmits a request, which requests a print processing path, to a path detecting server, and in response receives path information indicating a print processing path from the path detecting server. The client transmits the path information and PDL data to an apparatus subsequent to the client on the print processing path indicated in the path information. The path detecting server receives the request from the client and finds a print processing path referring to information of printers and print servers stored in an apparatus information database. A path detecting server transmits to the client path information indicating the print processing path.

19 Claims, 11 Drawing Sheets

FOREIGN PATENT DOCUMENTS

| | | |
|---|---|---|
| JP | 2001-257827 | 9/2001 |
| JP | 2003-167709 | 6/2003 |
| JP | 2004-102613 | 4/2004 |
| JP | 2004-112585 | 4/2004 |
| JP | 2005-038027 | 2/2005 |
| JP | 2005-078461 | 3/2005 |
| JP | 2005-216230 | 8/2005 |

OTHER PUBLICATIONS

Extended European Search Report for corresponding European Application No. 07253706.1 dated Feb. 8, 2012.

Office Action for corresponding Japanese Application No. 2007-193878 mailed Feb. 21, 2012.

* cited by examiner

| FILE FORMAT | WORD |
|---|---|
| PDL DATA FORMAT | RAW,PostScript |
| PROCESSING SPEED | 1 GHz |
| LOAD | HIGH |
| POSITION INFORMATION | 1F(10,10) |
| ORDER CONDITION | |
| PRINTER SPECIFICATION | |

FIG. 3

| IDENTIFICATION NAME | PDL DATA FORMAT | | PROCESSING CAPABILITY INFORMATION | | POSITION | COST | IMAGE QUALITY | REMARKS |
|---|---|---|---|---|---|---|---|---|
| | INPUT | OUTPUT | PROCESSING SPEED | LOAD | | | | |
| CLIENT PC 1 | – | RAW, PostScript | 1 GHz | LOW | 1F (10,10) | – | – | |
| PRINTER P1 | RPCS | – | 10 ppm | LOW | 1F (10,20) | 10 YEN | 600 dpi | |
| PRINTER P2 | PCL | – | 20 ppm | MEDIUM | 1F (15,10) | 12 YEN | 1200 dpi | OPERATING ACCORDING TO PRINT PROCESSING PROCEDURE |
| PRINT SERVER PS1 | PostScript | RPCS, PCL | 2 GHz | LOW | – | – | – | |
| PRINT SERVER PS2 | WORD, PDF, PostScript | PostScript, PDF | 3 GHz | LOW | – | – | – | |
| PRINT SERVER PS3 | PDF | RPCS | 3 GHz | HIGH | – | – | – | |

FIG. 5

| | PRINT PROCESSING PATH | | | PROCESSING TIME [SECOND] | DISTANCE [METER] | COST [YEN] | TOTAL COST [YEN] | IMAGE QUALITY [dpi] |
|---|---|---|---|---|---|---|---|---|
| A | CLIENT PC 1 OUTPUT:PostScript | PRINT SERVER PS1 OUTPUT:rpcs | PRINTER P1 | | 7.5 | 10 | 10 | 27.5 | 600 |
| B | CLIENT PC 1 OUTPUT:RAW | PRINT SERVER PS2 OUTPUT: PostScript | PRINT SERVER PS1 OUTPUT:rpcs | PRINTER P1 | 7 | 10 | 10 | 27 | 600 |
| C | CLIENT PC 1 OUTPUT:RAW | PRINT SERVER PS2 OUTPUT:PDF | PRINT SERVER PS3 OUTPUT:rpcs | PRINTER P1 | 7.5 | 10 | 10 | 27.5 | 600 |
| D | CLIENT PC 1 OUTPUT:PostScript | PRINT SERVER PS1 OUTPUT:PCL | PRINTER P2 | | 9.5 | 5 | 12 | 26.5 | 1200 |

| FILE FORMAT | WORD |
|---|---|
| PDL DATA FORMAT | RAW, PostScript |
| PROCESSING SPEED | 1 GHz |
| LOAD | HIGH |
| POSITION INFORMATION | 1F (10,10) |
| ORDER CONDITION | |
| PRINTER SPECIFICATION | PRINTER 1 |

| FILE FORMAT | WORD |
|---|---|
| PDL DATA FORMAT | RAW,PostScript |
| PROCESSING SPEED | 1 GHz |
| LOAD | HIGH |
| POSITION INFORMATION | 1F(10,10) |
| ORDER CONDITION | |
| PRINTER SPECIFICATION | COLOR,TWO-SIDED |

| FILE FORMAT | WORD |
| --- | --- |
| PDL DATA FORMAT | RAW, PostScript |
| PROCESSING SPEED | 1 GHz |
| LOAD | HIGH |
| POSITION INFORMATION | 1F (10,10) |
| ORDER CONDITION | PROCESSING SPEED |
| PRINTER SPECIFICATION | |

FIG. 13

| IDENTIFICATION NAME | PDL DATA FORMAT | | PROCESSING CAPABILITY INFORMATION | | POSITION | COST | IMAGE QUALITY | REMARKS |
|---|---|---|---|---|---|---|---|---|
| | INPUT | OUTPUT | PROCESSING SPEED | LOAD | | | | |
| CLIENT PC 1 | - | - | - | - | 1F (10,10) | - | - | - |
| WEB SERVER 4 | - | RAW | 1 GHz | LOW | | | - | - |
| PRINTER P1 | RPCS | - | 10 ppm | LOW | 1F (10,20) | 10 YEN | 600 dpi | PULL PRINTING IS AVAILABLE |
| PRINT SERVER PS1 | PDL | RPCS | 3 GHz | HIGH | - | - | - | |
| PRINT SERVER PS2 | PDL | PostScript, PCL | 3 GHz | LOW | - | - | - | OPERATING ACCORDING TO PRINT PROCESSING PROCEDURE |
| PRINT SERVER PS3 | PostScript | RPCS | 3 GHz | LOW | - | - | - | - |

FIG. 14

| | PRINT PROCESSING PATH | | | PROCESSING TIME [SECOND] | DISTANCE [METER] | COST [YEN] | TOTAL COST [YEN] | IMAGE QUALITY [dpi] |
|---|---|---|---|---|---|---|---|---|
| A' | WEB SERVER 4 OUTPUT:RAW | PRINT SERVER PS1 OUTPUT:rpcs | PRINTER P1 | | 7.2 | 10 | 10 | 27.2 | 600 |
| B' | WEB SERVER 4 OUTPUT:RAW | PRINT SERVER PS2 OUTPUT:PostScript | PRINT SERVER PS3 OUTPUT:rpcs PULL PRINTING | PRINTER P1 | 6.8 | 10 | 10 | 26.8 | 600 |
| C' | WEB SERVER 4 OUTPUT:RAW | PRINT SERVER PS2 OUTPUT:PDF | PRINT SERVER PS3 OUTPUT:rpcs | PRINTER P1 | 6.8 | 10 | 10 | 26.8 | 600 |

FIG. 15

| IDENTIFICATION NAME | ADDRESS | PDL DATA FORMAT | | PRINT FUNCTION INFORMATION | | | | |
|---|---|---|---|---|---|---|---|---|
| | | INPUT | OUT-PUT | TWO-SIDED | PAPER | COLOR | N-UP | STAPLE |
| CLIENT 100 | 102.102.102.102 | - | - | - | - | - | - | |
| CLIENT 101 | 102.102.102.103 | | PCL | | | | | |
| PRINT SERVER PS1 | http:// 102.102.102.102/PrintServer | WORD, POWER POINT | RPCS | ALL FUNCTIONS OF PRINTER P2 | | | | |
| PRINT SERVER PS2 | http:// 102.102.102.103/PrintServer | WORD, POWER POINT | PCL | ALL FUNCTIONS | | | | |
| | | | | TWO-SIDED,PAPER,COLOR ONLY | | | | |
| PRINTER P1 | 103.103.103.103:9100 | RPCS | - | SINGLE-SIDED, TWO-SIDED | A3,A4 | MONOCHROME, COLOR | 2 in 1, 4 in 1 | - |
| PRINTER P2 | 101.101.101.101:9100 | PCL | - | SINGLE-SIDED, TWO-SIDED | A3,A4 | MONOCHROME, COLOR | 2 in 1, 4 in 1 | O |

PATH DETECTING SERVER, CLIENT APPARATUS, PATH DETECTING SYSTEM, PATH DETECTING METHOD, AND COMPUTER PROGRAM PRODUCT

CROSS-REFERENCE TO RELATED APPLICATIONS

The present application claims priority to and incorporates by reference the entire contents of Japanese priority documents, 2006-253288 filed in Japan on Sep. 19, 2006 and 2007-193878 filed in Japan on Jul. 25, 2007.

BACKGROUND OF THE INVENTION

1. Field of the Invention

The present invention relates to a print processing system in which client devices, printers, and print servers are connected to each other via a network.

2. Description of the Related Art

Technologies are known that make it possible to select an optimal combination of a plurality of apparatuses to perform a printing process. Japanese Patent Application Laid-Open No. 2004-102613, for example, discloses a technology that makes it possible to determine, based on processing capabilities of the apparatuses and print job attributes indicating print conditions for performing the printing process, an optimal combination of printing apparatuses on which a printing process can be performed.

On the other hand, Japanese Patent Application Laid-Open No. 2005-078461 discloses a distributed processing system that executes a process by distributing portions of the process on a plurality of apparatuses. In this system, a client computer selects a server computer from among a plurality of server computers, based on processing capabilities and operating conditions of the server computers, to perform an image processing, and requests the selected server to execute the processing. This technology makes it possible to execute the image processing efficiently.

The technology disclosed in Japanese Patent Application Laid-Open No. 2004-102613 is not suitable for distributed processing. On the other hand, the technology disclosed in Japanese Patent Application Laid-Open No. 2005-078461 requires that the client computer has the information about the process conditions of the entire print processing system, which is not practical.

SUMMARY OF THE INVENTION

It is an object of the present invention to at least partially solve the problems in the conventional technology.

According to an aspect of the present invention, there is provided a path detecting server connected to a client apparatus that transmits print command data over a network to one or more printers that perform a printing process according to the print command data. The path detecting server includes a storage unit that stores therein first data format information that indicates a data format, which is processable by the printers, of the print command data; a receiving unit that receives from the client apparatus second data format information that indicates a data format, which is processable by the client apparatus, of the print command data; a selecting unit that selects, referring to the first data format information, a printer from among the printers, that is capable of processing the print command data in the data format indicated in the second data format information; and a path transmitting unit that transmits to the client apparatus path information indicating a transmitting path to selected printer.

According to another aspect of the present invention, there is provided a client apparatus that is connected via a network to one or more printers and one or more print servers that relay print command data indicating printing to and from the printers, and that transmits over the network the print command data. The client apparatus includes a format transmitting unit that transmits over the network to a path detecting server second data format information indicating a data format, processable by the client apparatus, of the print command data; a path receiving unit that receives path information indicating a transmitting path having one of the printers as a destination and at least one of the print servers as a relay point, the path information being sent from the path detecting server in response to the second data format information; and a command transmitting unit that transmits, to an apparatus specified as a relay point and placed subsequent to the client apparatus on the transmitting path indicated in the path information, path specification information including the print command data and information specifying another relay point subsequent to the relay point or the destination on the transmitting path.

According to still another aspect of the present invention, there is provided a path detecting system including a client apparatus that transmits print command data to command a printing process; one or more printers, connected to the client apparatus via a network and performing a printing process according to the print command data received from the client apparatus; and a path detecting server. The client apparatus includes a format transmitting unit that transmits to the path detecting server second data format information indicating a data format, processable by the client apparatus, of the print command data; a path receiving unit that receives path information from the path detecting server along with the data format information and indicating a transmitting path having, as its destination, one of the printers; and a command transmitting unit that transmits the print command data to the printer serving as the destination on the transmitting path indicated in the path information. The path detecting server includes a storage unit that stores therein first data format information indicating a data format, processable by the printers; a receiving unit that receives from the client apparatus the second data format information; a selecting unit that selects, referring to the first data format information, a printer from among the printers capable of processing the print command data in the data format indicated in the second data format information; and a path transmitting unit that transmits to the client apparatus path information indicating a transmitting path destined to selected printer.

According to still another aspect of the present invention, there is provided a path detection method including transmitting second data format information from a client apparatus to a path detecting server connected to the client apparatus via a network, the second data format information indicating a data format, processable by the client apparatus, of print command data indicating printing and being sent from the client apparatus via the network connecting to one or more printers; receiving at the path detecting server the second data format information; selecting at the path detecting server a printer from among the printers capable of processing the print command data in the second data format by referring to first data format information stored in a storage unit and indicating a data format, processable by the printers, of the print command data; transmitting to the client apparatus path information indicating a transmitting path having as a destination the printer selected at the selecting; receiving at the client apparatus path information from the path detecting server along with the data format information and indicating a transmitting path having, as a destination, one of the printers; and transmitting the print command data from the client apparatus to the printer serving as the destination on the transmitting path indicated in the path information.

According to still another aspect of the present invention, there is provided a computer program product including a computer-readable recording medium that stores therein a computer program that causes a computer to function as a path detecting server connected to a client apparatus that transmits print command data over a network connecting to one or more printers performing a printing process according to the print command data and at least one print server relaying the print command data. The computer program causing the computer to execute receiving from the client apparatus data second format information indicating a data format, processable by the client apparatus, of the print command data; selecting a printer from among the printers capable of processing the print command data in the second data format by referring to first data format information stored in a storage unit and indicating the data format, processable by the printers, of the print command; and transmitting to the client apparatus path information indicating a transmitting path destined for selected printer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of contents of an apparatus information database according to the first embodiment;

FIG. 5 is an example of data structure of path information according to the first embodiment;

FIG. 13 is an example of data structure of an apparatus information database provided in a path detecting server shown in FIG. 11;

FIG. 14 is an example of data structure of path information according to the second embodiment; and FIG. 15 is an example of data structure of an apparatus information database of a path detecting server according to a third embodiment of the present invention.

DETAILED DESCRIPTION OF THE PREFERRED EMBODIMENTS

Exemplary embodiments of the present invention will be described below in greater detail with reference to the accompanying drawings.

Figures 1, 2:
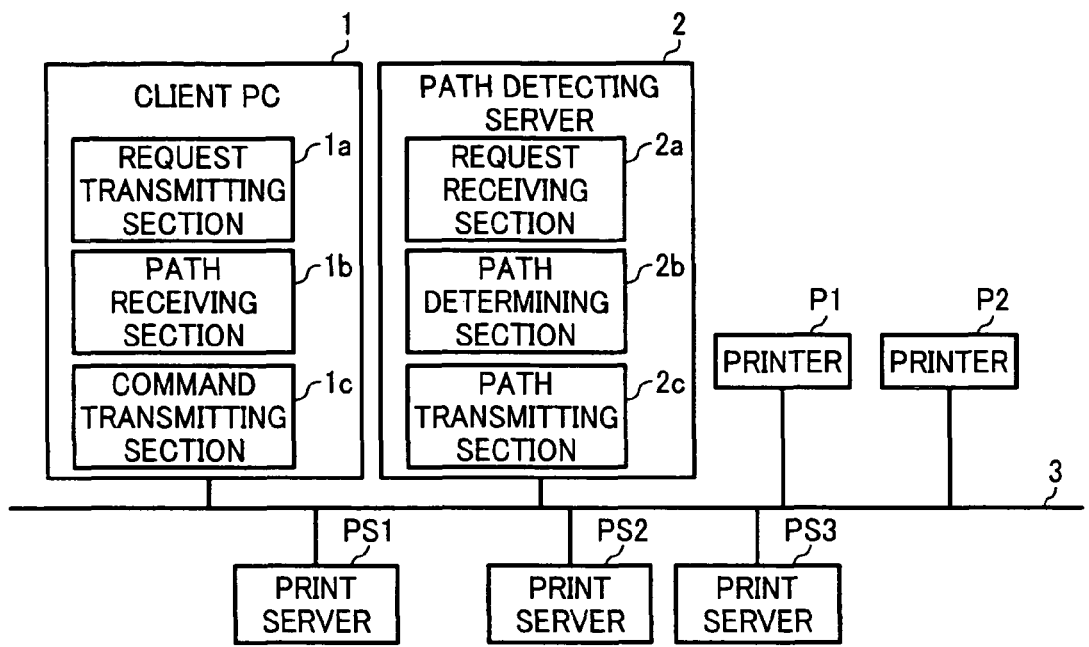
FIG. 1 is a block diagram of a print processing system according to a first embodiment of the present invention.
FIG. 2 is an example of data structure of path request information according to the first embodiment.

FIG. 1 is a block diagram of a print processing system according to a first embodiment of the present invention. The print processing system includes a client personal computer (PC) 1, a path detecting server 2, printers P1 and P2, and print servers PS1, PS2, and PS3, all of which are connected to each other via a network 3. The network 3 can be a LAN, intranet, or the Internet. Hereinafter, when not needed to be distinguished, the printers P1 and P2 are indicated simply as printers P, and the print servers PS1, PS2, and PS3 are indicated simply as print servers PS. The number of the client PCs, the printers P, and the print servers PS is not limited to those shown in FIG. 1. Furthermore, each of the client PCs, printers P, and print servers PS includes, although not shown in the diagram, at least a central processing unit (CPU), a read only memory (ROM) that stores therein various programs and data, a random access memory (RAM), a communicating unit, and a bus that connects all these units to each other.

The client PC 1 is connected to a display apparatus (not shown), an input apparatus (not shown) that receives a user command, and a hard disk drive (HDD) (not shown). The HDD stores therein computer programs to create print command data, and a printer driver to convert the print command data to PDL data described in a page description language (PDL). The PDL data can be in processed data format or raw data format. The PDL data in the processed data format is data described in various data formats, such as PostScript, refined printing command stream (RPCS), printer control language (PCL), LBP image processing system (LIPS), and Epson standard code/page (ESC/Page). The PDL data in the raw data format is data created by an application such as Microsoft Word (Trademark), and data created by HTML. The client PC 1 is capable of handling PDL data of both the formats.

In the client PC 1, the CPU executes various programs stored in the ROM or HDD, so as to create print command data according to a print command entered by the user from the input apparatus. The client PC 1 then outputs the created print command data, which can be PDL data in any of the two formats. The print command entered by the user specifies a file to be printed (print target file), a printer P, print conditions for performing a printing process, condition on order (described later), and the like. Examples of the print conditions include "color printing", "two-sided printing", etc.

The client PC 1 includes a request transmitting section 1a, a path receiving section 1b, and a command transmitting section 1c. Each of these sections is generated on the RAM by causing the CPU of the client PC 1 to execute computer programs stored in the ROM. The request transmitting section 1a transmits, according to a print command entered by the user from the input apparatus, to the path detecting server 2 path request information that requests path information indicating a print processing path for properly performing a printing process. The print processing path is a path starting from a client PC that requests the printing process and ending to a printer that is to perform the printing process. The print processing path can go through one or more print servers in which case that print server(s) simply serve as a relay point. Thus, the print processing path is a route to transmit PDL data from a client PC to a printer.

FIG. 2 is an example of data structure of path request information. The path request information includes file format information, data format information, processing capability information, and position information. The file format information is information about the type of the file to be printed, for example, information determined based on an extension added to the file name. The data format information is information about a data format of PDL data that can be output from the client PC 1. The processing capability information is information about the processing capability of the client PC 1. The processing capability of the client PC 1 means the processing speed of the client PC 1 and the load on the client PC 1. The processing speed is represented by the frequency of the CPU, while the load is represented by high, low, or medium. The position information is information about where the client PC 1 is placed and represented by, for example, a floor number on which the client PC 1 is placed and two-dimensional coordinates of location of the client PC 1. The position information is found by, for example, a positioning system such as a global positioning system (GPS), or a positioning system using a short-range wireless communication technology such as a wireless LAN, RFID, or Bluetooth.

Referring back to FIG. 1, the path receiving section 1b receives from the path detecting server 2 path information (described later) indicating a print processing path. The command transmitting section 1c transmits the path information and created PDL data to an apparatus subsequent to the client PC 1 on the print processing path indicated in the path information.

The path detecting server 2 is connected to a HDD (not shown) in which an apparatus information database is stored. FIG. 3 is an example of contents of the apparatus information database. The apparatus information database contains, in an associated manner, identification names and processing capability information of the client PC 1, the printers P1 and P2, and the print servers PS1, PS2, and PS3. The identification name of each apparatus may be any unique name given by the user or may be, for example, a unique network address assigned to each apparatus, or a MAC address specific to each apparatus. The processing capability information, as described above in connection with the structure of the client PC 1, is information about the processing capability of and the load on each apparatus.

The processing capability information of the printers P1 and P2 and the print servers PS1, PS2, and PS3 is obtained as follows. That is, the path detecting server 2 transmits a request to each of the printers P1 and P2 and the print servers PS1, PS2, and PS3 to send their processing capability information. In response, each of the printers P1 and P2 and the print servers PS1, PS2, and PS3 send their processing capability information to the path detecting server 2. The path detecting server 2 receives the processing capability information and stores it in the apparatus information database. In contrast, when the path detecting server 2 receives the path request information from the client PC 1, the path detecting server 2 extracts the processing capability information of the client PC 1 from the received path request information and stores the extracted processing capability information in the apparatus information database.

Further, for the client PC 1, position information and data format information indicating a PDL data format (output) that can be output by the client PC 1 is associated and stored in the apparatus information database. The position information and data format information, as it is included in the path request information sent from the client PC 1, is collected and stored in the apparatus information database when the path detecting server 2 receives the path request information.

Further, for the printers P1 and P2, position information, data format information indicating PDL data formats (input) interpretable by the printers P1 and P2, cost information, and image quality information is associated and stored in the apparatus information database. The cost information indicates running cost of the printers P1 and P2. The image quality information indicates image quality of the printers P1 and P2 determined by their resolution, color gradation, various image correction technologies, and the like. The image quality is determined by resolution. Further, the PDL data format interpretable by the printer P1 is RPCS format, and the PDL data format interpretable by the printer P2 is PCL format.

Further, for the print servers PS1, PS2, and PS3, data format information indicating PDL data formats (input) interpretable by the print servers PS1, PS2, and PS3, and PDL data formats (output) convertible by the print servers PS1, PS2, and PS3, and position information is associated and stored in the apparatus information database. The PDL data format interpretable by the print server PS1 is PostScript format, and the PDL data format convertible by the print server PS1 includes RPCS and PCL formats. The PDL data format interpretable by the print server PS2 includes Word (raw format), PDF, and PostScript formats, and the PDL data format convertible by the print server PS2 includes PDF and PostScript formats. Further, the PDL data format interpretable by the print server PS3 is PDF format, and the PDL data format convertible by the print server PS3 is RPCS format.

The path detecting server 2 includes, as shown in FIG. 1, a request receiving section 2a, a path determining section 2b, and a path transmitting section 2c. Each of these sections is generated on the RAM by causing the CPU of the path detecting server 2 to execute computer programs stored in the ROM. The request receiving section 2a receives path request information from the client PC 1, and stores in the apparatus information database the data format information and processing capability information included in the path request information. The path determining section 2b detects, referring to information of the printers P1 and P2 and the print servers PS1, PS2, and PS3, stored in the apparatus information database, a combination of apparatuses capable of performing a printing process, so as to find a print processing path. The path transmitting section 2c transmits to the client PC 1 path information indicating the print processing path found by the path determining section 2b.

According to the path information, the print server PS, when it receives PDL data and path information from the client PC 1 or another print server PS, transmits to a subsequent apparatus (another print server PS or printer P) the path information and the PDL data converted to be interpretable by the apparatus subsequent to the print server PS on the print processing path indicated in the path information. As described above, the PDL data format interpretable by the print servers PS1, PS2, and PS3, and the PDL data format convertible by the print servers are previously determined.

The printers P1 and P2 can be a laser printer or plotter, for example, and can interpret PDL data sent from the client PC 1 to perform a printing process. For each of the printers P1 and P2, an interpretable PDL data format is previously determined.

Figure 4:
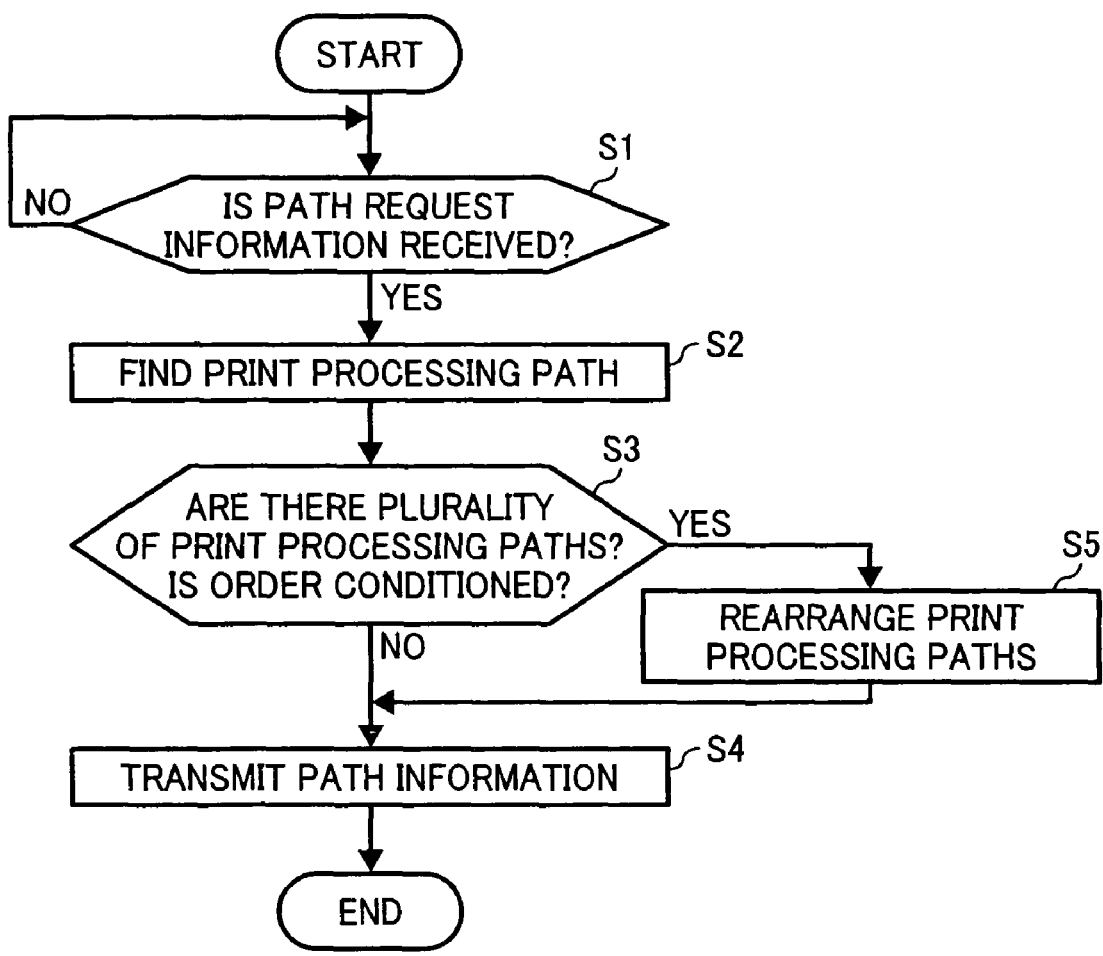
FIG. 4 is a flowchart of a print command processing performed in the print processing system according to the first embodiment.

FIG. 4 is a flowchart of a print processing commands performed in the print processing system according to the embodiment. The client PC 1 creates PDL data according to a print command entered by the user from the input apparatus. On the other hand, the client PC 1 transmits to the path detecting server 2 path request information requesting a print processing path. The path request information includes data format information and processing capability information. Upon receiving path request information from the client PC 1 (YES at step S1), the path detecting server 2 stores, in the apparatus information database, data format information and processing capability information included in the path request information. Further, the path detecting server 2 finds, using data format information of the printers P and the print servers PS, stored in the apparatus information database, a print processing path for a combination of apparatuses capable of performing the printing process (step S2). For example, when the data format indicated in data format information included in the path request information is PostScript format, a print processing path is found that is destined for the printer P1 via the print server PS1. Further, a print processing path is found that is destined for the printer P2 via the print server PS1. Furthermore, when the data format indicated in data format information included in the path request information is a raw format, a print processing path is found that is destined for the printer P1 via the print servers PS2 and PS1. Further, a print processing path is found that is destined for the printer P1 via the print servers PS1 and PS3. FIG. 5 is an example of a data structure of path information. The path information indicates identification names of the apparatuses on each of the print processing paths A, B, C, and D in the order of the apparatuses placed from the start point to the destination. Further, for the client PC 1 and the print servers PS, data formats to output PDL data are indicated. The path detecting server 2 creates path information indicating print processing paths thus found, and transmits it to the client PC 1 (step S4). Note that, description for step S3 is omitted here regarding no condition is provided on order, and steps S3 and S5 will be described later.

The client PC 1, when it receives path information sent from the path detecting server 2, transmits the path information and PDL data to an apparatus subsequent to the client PC 1 on the print processing path indicated in the path information. When the path information includes a plurality of pint processing paths, the client PC 1 selects one of them. The selection may be performed by selecting the first print processing path or by selecting any one of them. For example, assume that the client PC 1 selects print processing path A. Through the print processing path A, the client PC 1 transmits the path information and PDL data to the print server PS1. The print server PS1, when it receives these pieces of information, converts the PDL data to PDL data in a format for the print processing path indicated in the path information, and transmits the path information and the PDL data to the printer P1 subsequent to the print server PS1 on the print processing path. The printer P1, when it receives these pieces of information, interprets the PDL data to perform the printing process.

With the arrangement, the printer P performs the printing process for the print processing path found by the path detecting server 2, starting from the client PC 1 through other apparatuses. This enables the printing process to be properly performed. Further, the arrangement enables the printing process even when the client PC 1 does not know a PDL data format interpretable by the printer P or even when the print command data cannot be converted to a PDL data format interpretable by the printer P, thereby improving the user convenience.

Figures 6, 7:
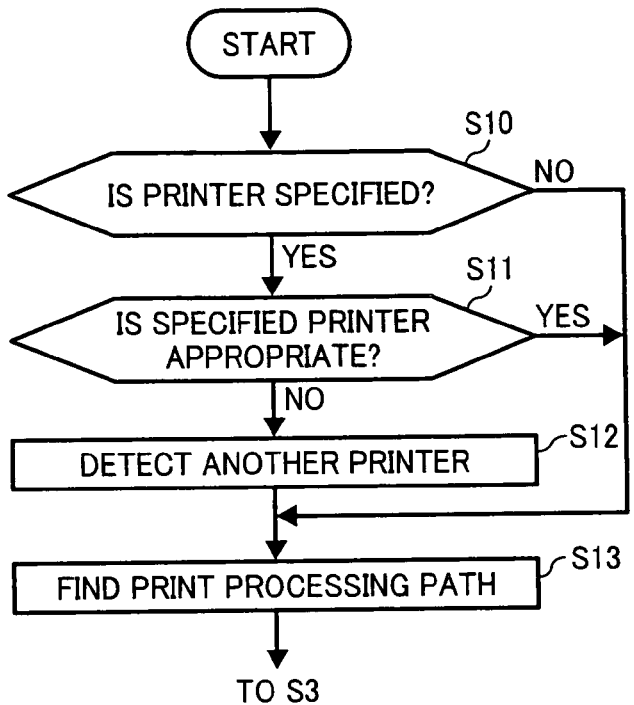
FIG. 6 is a flowchart of a print command processing when a user specifies a printer.
FIG. 7 is an example of data structure of path request information for use in the print command processing shown in FIG. 6.

The following describes a print command processing when the user specifies a printer P (printer P1 or P2) with a print command. FIG. 6 is a flowchart representing a print command processing when the user specifies a printer P with a print command.

When the user specifies the printer P, the client PC 1 transmits to the path detecting server 2 the path request information including printer specification information specifying a printer. FIG. 7 is an example of data structure of path request information including printer specification information. In FIG. 7, the printer specification information specifies the printer P1 (printer 1). The path detecting server 2 receives path request information from the client PC 1. When the path request information includes printer specification information (YES at step S10), the path detecting server 2 determines whether the printer P specified in the printer specification information is appropriate, referring to the apparatus information database (step S11). The path detecting server 2, when it determines the specified printer is appropriate (YES at step S11), finds a print processing path for a combination of apparatuses capable of performing the printing process, using the data format information and printer specification information included in the path request information and referring to the data format information of the printers and the print servers, stored in the apparatus information database (step S13). The path detecting server 2 finds a print processing path destined for the printer P1 when the printer P1 is specified, or a print processing path destined for the printer 2 when the printer P2 is specified. The sequence then goes to step S3 of FIG. 4. Here, assume that the determination result in step S3 is positive. In this case, the path detecting server 2 creates path information in which identification names of apparatuses placed at the start point, relay point, and destination on the print processing path thus found are arranged, and transmits the path information to the client PC 1 (step S4). The operations in the subsequent steps are the same as those described above, and therefore their descriptions are omitted.

Note that, determining the printer P specified in step S11 is inappropriate includes, for example, determining that the specified printer is inappropriate to perform the printing process. Determining the specified printer is inappropriate includes, for example, determining that the printer P is not near the client PC 1, referring to position information of the specified printer P, stored in the apparatus information database. This is because the user might have specified the printer P by mistake. Whether the printer P1 is near the client PC 1 may be determined, for example, depending on whether the positions indicated in the position information are on the same floor. This prevents an undesirable apparatus on a different floor from performing the printing process even when a plurality of printers P having the same identification name is placed on different floors. Further, determining the specified printer P is inappropriate includes predicting that performing the printing process takes time when the specified printer P is in use.

The path detecting server 2, when it determines the printer P specified in step S11 is inappropriate (NO at step S11), detects another printer capable of performing the printing process with a better condition than the printer specified in the printer specification information, referring to process capability information of the printers P, stored in the apparatus information database (step S12). Examples of the better condition include being closer to the client PC 1, being able to perform the printing at a higher speed, lower cost, and better image quality. In the apparatus information database shown in FIG. 3, the printer 2 (printer P2) is more excellent than the printer 1 (printer P1) with regard to processing speed, image quality, and position. This allows the printer 2 (printer P2) to be suggested as an alternative of the printer 1 (printer P1).

Further, in step S2, the path detecting server 2 finds a print processing path destined for the alternative printer found as a result of the detection. The path detecting server 2 may separately transmit to the client PC 1 information indicating the alternative printer, not the information indicating the print processing path destined for the alternative printer.

Further, when a plurality of printers P are specified by the user, i.e., when a plurality of printers are specified in the printer specification information, the path detecting server 2 finds print processing paths destined for the respective printers, and transmits to the client PC path information indicating the print processing paths thus found.

As a result of step 13, when the print processing path destined for the printer specified by the user is not found, the path detecting server 2 transmits to the client PC 1 warning information issuing the result.

In this way, a print processing path can be found that leads to a printer desired by the user. It also becomes possible to suggest to the user another printer that is equal to or more excellent than the printer desired by the user, improving user convenience.

Figures 8, 9:
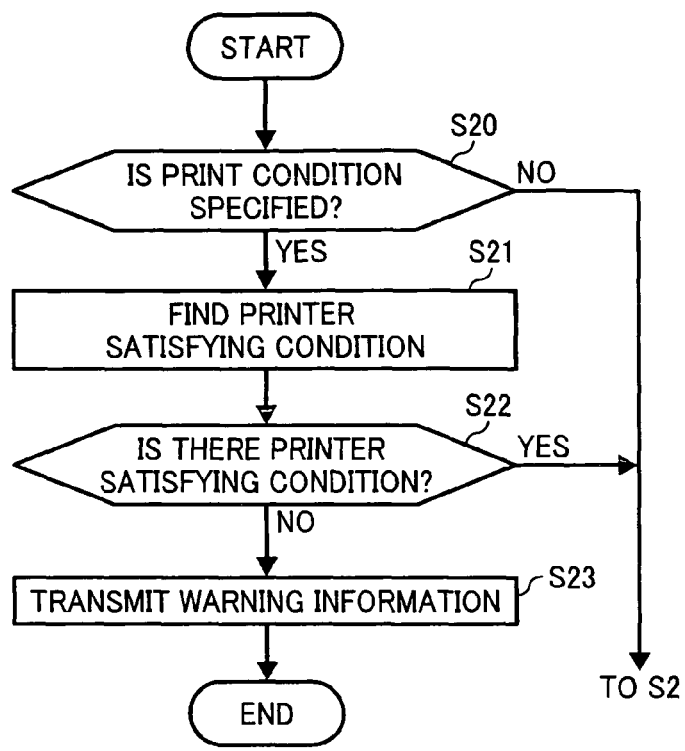
FIG. 8 is a flowchart of a print command processing when a print condition is specified.
FIG. 9 is an example of data structure of path request information for use in the print command processing shown in FIG. 8.

Further, the printer P itself may not be specified, and instead the path detecting server 2 may select a printer P according to the print conditions specified with an input of a print command. In this arrangement, print processing property information indicating print processing properties of each printer P is previously stored in the apparatus information database of the path detecting server 2. FIG. 8 is a flowchart of a print command processing when the print conditions are specified. When the print conditions are specified with an input of a print command, the client PC 1 transmits to the path detecting server 2 path request information including, as print specification information, the print conditions specified with an input of the print command. FIG. 9 is an example of data structure of path request information including printer specification information. In FIG. 9, the printer specification information specifies "color printing" and "two-sided printing" as print conditions. The path detecting server 2 receives the path request information from the client PC 1. When the path request information includes printer specification information (YES at step S20), the path detecting server 2 finds, using the printer specification information and referring to the print processing property information of each printer, stored in the apparatus information database, a printer capable of performing the printing process with the specified print conditions (step S21). When a printer is found that is capable of performing the printing process with the specified print conditions (YES at step S22), in step 2, the path detecting server 2 finds a print processing path destined for the printer.

Figures 10, 11:
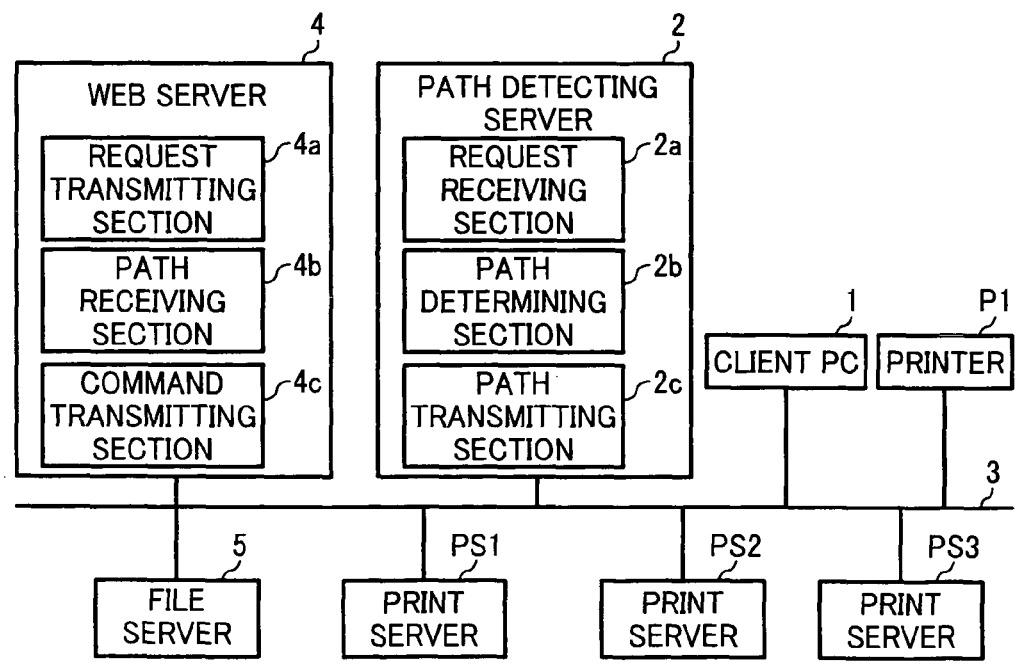
FIG. 10 is an example of data structure of path request information including order condition information according to the first embodiment.
FIG. 11 is a block diagram illustrating a structure of a print processing system according to a second embodiment of the present invention.

The following describes steps S3 and S5 (see FIG. 4) in which a plurality of print processing paths found by the path detecting server 2 are ordered. Condition on order (order condition) can specify that priority is given to, for example, processing speed, distance, cost, or image quality. Such order condition is specified by, for example, the user via the input apparatus. When the order condition is specified by the user, the client PC 1 transmits to the path detecting server 2 path request information including order condition information indicating the order condition. FIG. 10 is an example of data structure of the path request information including order condition information. In FIG. 10, the order condition specifies processing speed to be prioritized.

In step S3, the path detecting server 2 determines whether a plurality of print processing paths have been found in step S2 and whether the path request information received in step S2 includes order condition information. When the determination result is positive (YES at step S3), in step S5, an ordering process is performed as follows according to the order condition information. When the order condition information specifies processing speed to be prioritized, the path detecting server 2 calculates a processing time for each print processing path, referring to processing speeds of the printers and print servers on the each print processing path, stored in path information database, so as to rearrange the print processing paths in order of processing time with the shortest one first. The path detecting server 2 then transmits to the client PC 1 path information indicating the print processing paths rearranged in this order. The processing time may be calculated considering a loading state that influences the actual processing speed. For Example, in the apparatus information database shown in FIG. 3, inverse numbers of the processing speeds of the client PC 1 and the print servers PS are summed and multiplied by a constant number, and then the processing times of the printers P are added. This provides rough estimation of the processing time. The multiplying constant, which increases in proportion to the size of a print target file, is given here as 1. The processing time of the printer increases in proportion to the number of copies, and the number of copies is given here as 1. For the print server PS that relays PDL data without performing the actual printing process, the processing speed is multiplied by 5. The processing speed of each of the client PC and the print server PS is multiplied by a coefficient corresponding to each loading state. Such coefficient is set to "1" for a low loading state, "⅔" for a medium loading state, and "⅔" for a high loading state. The processing time of each printer is added with a constant number corresponding to each lading state. Such constant number is, for example, "0" for a low loading state, "5" for a medium loading state, and "10" for a high loading state. For example, as to the processing time of the print processing paths A, B, C, and D shown in FIG. 5, the processing time is shorter in the order of B, A or C, and D. That is, it is determined that the processing speed is faster in this order. Accordingly, the path detecting server 2 arranges the print processing paths in the order of B, A or C, and D, and transmits to the client PC 1 path information indicating the print processing path information of the arranged paths (step S4).

When the order condition information specifies distance to be prioritized, the path detecting server 2 calculates a distance of each print processing path referring to position information of the printers and print servers on the each print processing path, stored in the path information database, so as to rearrange the print processing paths in order of distance with the shortest one first. For example, as to the print processing paths A, B, C, and D shown in FIG. 5, it is determined that the distance of D is shortest and the distances of A, B, and C are equal. As described above, after the print processing paths are rearranged, the path detecting server 2 transmits to the client PC 11 path information indicating the print processing paths rearranged in this order.

Further, when the order condition information specifies cost to be prioritized, the path detecting server 2 calculates a cost for each print processing path, referring to costs of the respective printers and print servers on each print processing path, stored in the path information database, so as to rearrange the print processing paths in order of cost with the lowest one first. As to the print processing paths A, B, C, and D shown in FIG. 5, it is determined that A, B, and C are the same and D is higher. The cost for each print processing path may be found as a total cost by adding a processing time and a distance from the client PC 1 to running cost of each printer P and then by converting the sum into cost. For example, the processing time of 1 second is converted to 1 yen and the distance of 1 meter is converted to 1 yen. In this case, it is determined that cost is lower in the order of D, B, and A or C as shown in FIG. 5. After the print processing paths are rearranged, the path detecting server 2 transmits to the client PC 1 path information indicating the print processing paths rearranged in this order.

When the order condition information specifies image quality to be prioritized, the path detecting server 2 calculates an image quality of each processing path, referring to image quality information of the printers and print servers on each print processing path, stored in the path information database, so as to rearrange the print processing paths in order of image quality with the highest one first. As to the image qualities of the print processing paths A, B, C, and D shown in FIG. 5, it is determined that D is highest and A, B, and C are equal. As described above, after the print processing paths are rearranged, the path detecting server 2 transmits to the client PC 1 path information indicating the print processing paths rearranged in this order.

Further, some of the order conditions may be combined to rearrange the print processing paths. For example, when the first priority is given to cost and the second priority to the processing speed as order conditions, the print processing paths A, B, C, and D are arranged such that D comes first followed by B, and A and C are the same in the order. When some paths are the same in the order as such, A and C may be ordered by using another order condition or any method.

The order conditions on the print processing paths may not be specified by the user and instead may previously be set by a system administrator. Further, the order conditions may be both specified by the user and set previously by the system administrator, and accordingly selection may be performed on whether to specify or set the order conditions.

The following describes an image forming apparatus according to a second embodiment of the present invention. Parts identical to those described in the first embodiment are described with the same reference numerals and their descriptions are omitted.

FIG. 11 is a block diagram of a print processing system according to the second embodiment. The structure of the print processing system of the present embodiment differs from that of the first embodiment in that the print processing system of the present embodiment includes the client PC 1, the path detecting server 2, the printer P1, and the print servers PS, and further includes a Web server 4 that provides various Web applications to the client PC 1, and a file server 5 that stores a print target file. The print target file stored in the file server is associated with a uniform resource locator (URL) indicating its memory location. In the present embodiment, the Web server 4 transmits print command data, instead of the client PC 1.

Figure 12:
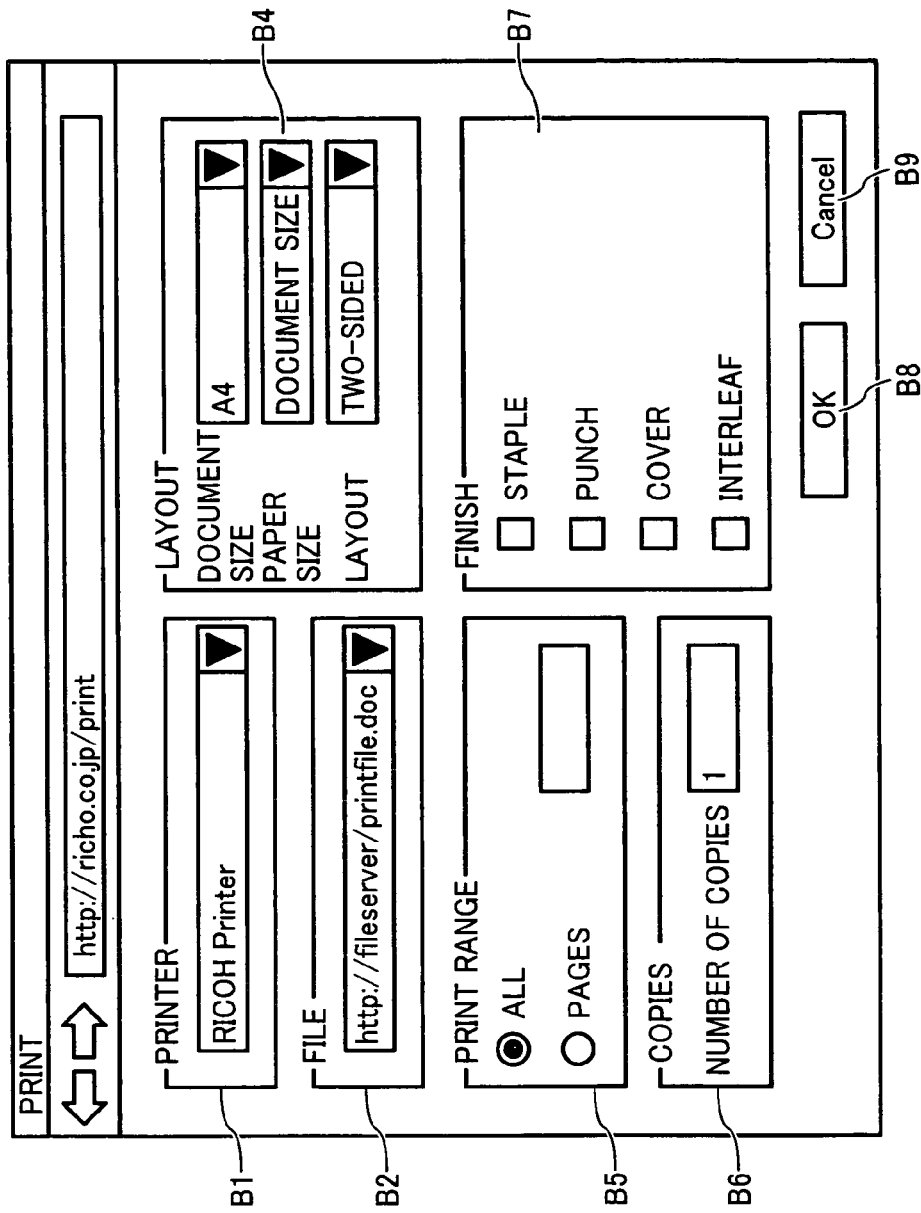
FIG. 12 is an exemplary view of a Web page appearing on a client PC 1 according to the second embodiment.

Examples of the client PC 1 include portable telephones, personal digital assistants (PDAs), and laptop PCs. The client PC 1 serves to execute various Web applications provided from the Web server 4, using a Web browser. The Web browser is an application to view a Web page written in hyper text markup language (HTML). FIG. 12 is an exemplary view of the Web page appearing on the client PC 1. The Web page contains a printer specification box B1, a print target file specification box B2, and print processing property specification boxes B4 to B7. On the client PC 1 displaying the Web page, the user enters in the print target file specification box B2 a URL of the print target file stored in the file server 5. Further, to specify a printer, the user enters the printer in the printer specification box B1, and accordingly enters in the print processing property boxes B4 to B7 print conditions such as layout and finishing, and then presses an OK button B8. This allows the client PC 1 to transmit to the Web server 4 the information as print command data. The print target file may be selected by displaying a name list of the files stored in the file server 5 and then selecting one from the displayed file names, not directly entering a URL of the print target file in the print target file specification box B2 by the user.

The printer P1 has a pull printing function. The pull printing function allows the printer P1 itself to access the file server 5 to obtain a print target file so as to perform a printing process for the print target file.

FIG. 13 is an example of data structure of an apparatus information database of the path detecting server 2. The apparatus information database stores the information of the printer P1 and the print servers PS, and also an identification name of the Web server 4, a PDL data format (output) interpretable by the Web server 4, and a processing capability of the Web server 4. For the client PC 1, position information is stored. For the printer P1, having a pull printing function is associated and stored as remark information.

The Web server 4 includes at least a CPU, a ROM that stores various computer programs and data, a RAM, a communicating section, and a bus that connects these (all of which are not shown). Further, the Web server 4 includes a request transmitting section 4a, a path receiving section 4b, and a command transmitting section 4c. Each of these sections is generated on the RAM by causing the CPU of the Web server 4 to execute a program stored in the ROM.

The request transmitting section 4a, when it receives print command data from the client PC 1, identifies, referring to a URL indicated in the print command data, a file format of a print target file based on an extension added to the name of the print target file. The request transmitting section 4a then transmits to the path detecting server 2 file format information indicating the data format, and path request information that requests a print processing path to properly perform a printing process for the file. The path detecting server 2, when it receives the file format information and path request information from the path detecting server 2, finds, using the file format information and referring to the data format information of each printer P, stored in the apparatus information database, a print processing path that enables processing of data described in a format indicated in the file format information. FIG. 14 is an example of data structure of path information. The printer P1 has a pull printing function, and a print processing path enabling the pull printing function of the print P1 is found as C' in FIG. 14. The path detecting server 2 transmits to the Web server 4 path information indicating the print processing path thus found.

Referring back to FIG. 11, the path receiving section 4b receives the path information sent from the path detecting server 2. The command transmitting section 4c transmits, as performed by the client PC 1 in the first embodiment, the path information and print command data to an apparatus subsequent to the command transmitting section 4c on the print processing path, indicated in the path information received by the path receiving section 4b.

The path detecting server 2 may rearrange the print processing paths thus found, using the order condition described in the first embodiment, and transmit the path information indicating the print processing paths rearranged in this order. Further, the path detecting server 2 may rearrange the paths, using a condition concerning a load on the print processing system. For example, when the printing process is performed using the pull printing function of the printer P1, the load on the printer P1 is reduced. This minimizes the load on the print processing system, and the print processing path C' shown in FIG. 14 may be arranged to be the first one in the order as a print processing path giving the minimum load on the print processing system.

In this manner, the printing process is performed via the Web server 4. This enables the printing process independently from the processing capability and storage capacity of the client PC 1.

The present invention is not limited to the embodiments and various modifications are possible as described below by way of example.

In the embodiments, the processing speed and the loading state are used as the processing capability information. However, the type of a CPU provided in each apparatus, memory capacity of each apparatus, or capacity of a hard disk may also be used as the processing capability information.

Further, the path detecting server 2 may collect the processing capability information of the client PC 1, by transmitting request information and then receiving from the client PC 1 its processing capability information in response to the request information. Further, the print processing system may include another server that collects processing capability information from the client PC 1, the printers P1 and P2, and the print servers PS1, PS2, and PS3, allowing the path detecting server 2 to collect the processing capability information from this server.

In the embodiments, the data format information and processing capability information of the client PC 1 is stored in the apparatus information database. However, such information may be stored in a RAM or the like, not in the apparatus information database.

In the embodiments, the client PC 1, the Web server 4, or the print servers PS may have a function to relay the path information and PDL data through a print processing path indicated in the path information. However, the client PC 1, the Web server 4, or the print servers PS may not transmit the path information itself to a direct receiver, and instead may transmit information specifying the order of receivers subsequent to the direct receiver. For example, through the print processing path C shown in FIG. 5 according to the first embodiment, the client PC 1 transmits to the print server PS2 information specifying receivers of PDL data sent from the print server PS2, i.e., the print server PS3 and the printer P1. Further, the print server PS2 transmits to the print server PS3 information specifying a receiver of the PDL data sent from the print server PS3, i.e., the printer P1. Then, the printer P1 receives only the PDL data from the print server PS3. With this arrangement, the last two apparatuses in the order on the print processing path may be conventional apparatuses that do not have the function specific to the present embodiment, i.e., the function to relay the path information.

In the second embodiment, the print server PS may transmit PDL data to another print server PS via the Web server 4. For example, through the print processing paths B' and C', the Web server 4 transmits print command data to the print server PS2. The print server PS2 then converts the print command data into PDL data, and transmits it to the Web server 4, not to the print server PS3. The Web server 4, when it receives these pieces of information, transmits to the printer server PS3 the information specifying the printer P1 and the PDL data according to the path information.

With the arrangement, as to the print processing paths B' and C', the print server PS2 may only have the function to convert print command data into PDL data and the function to transmit and receive data to and from the Web server 4. Further, the print server PS3 may only have the function to convert PDL data and the function to relay the PDL data to the printer P1. This allows use of a conventional print server instead.

Further, the Web server 4 may obtain information indicating whether the function specific to the present embodiment, i.e., the function to relay the path information, so as to find a print processing path based on the information.

In the embodiments, the path information and PDL data is directly transmitted to or received from an apparatus on a path indicated in the path information. However, the print processing system may include a routing server that provides a route for transferring data so that the path information and PDL data is transmitted to and received from each apparatus via the routing server.

In the embodiments, the file format of a print target file is determined based on an extension added to its file name. When no extension is added to the file name, however, the path detecting server 2 may determine the description format of the file, referring to content of the print target file, so as to determine the file format based on the relation between the description format and data format. The relation between the description format and file format may previously be stored in the path detecting server 2. Further, the client PC 1 may transmit to the path detecting server 2 a print target file itself or a URL where the print target file is stored. When the file format of the print target file cannot be determined, the path detecting server 2 may transmit to the client PC 1 data format error information indicating that the format is unknown. Further, the function to determine the file format of the print target file may be provided in the Web server 4, not in the path detecting server 2. Further, also in the second embodiment, the client PC 1 may determine the file format of a print target file, so as to transmit it to the Web server 4.

In the embodiments, when a plurality of print processing paths are provided, the path detecting server 2 may transmit path information including all the print processing paths, or may select an optimal print processing path and transmit path information indicating the optimal path. Examples of the optimal print processing path include, as described for the order condition in the first embodiment, a print processing path determined to have the shortest processing time based on the processing capability information, a print processing path destined for a printer P that is determined to have the highest image quality based on the image quality information, and a print processing path destined for a printer P that is determined to be closest to the client PC 1 based on the position information, and further a print processing path destined for a printer P that is determined to execute more sophisticated print processing.

In the second embodiment, the printer P1 has the pull printing function. However, the printer P1 may not have such function. Further, the print processing system may include a plurality of printers, some of which have the pull printing function and some do not.

According to the embodiments, various programs may be provided that are recorded in a computer readable recording medium such as a CD-ROM, flexible disk (FD), CD-R, or digital versatile disk (DVD) using an installable or executable file format. Alternatively, the various programs may be stored in another computer connected to the network 3 and downloaded via the network 3.

In the embodiment, the detection for a path may be performed by using print function information indicating a print function executable by the printer in the printing process and print function information indicating a print function executable by a print server in the printing process of the printer. Examples of the print function include "two-sided printing", "paper size", "color printing", "layout (N-up)", and "stapling".

For example, the print processing system shown in FIG. 1 may connect to a client 100 and a client 101 (both not shown). The client 100 is an information processing apparatus such as a portable telephone having no printer driver. The client 101 is an information processing apparatus having only a printer driver of the printer P2. FIG. 15 is an exemplary view of illustrating a structure of data stored in the apparatus information database of the path detecting server 2 as configured above. As shown in FIG. 15, for each apparatus, its address, the data format information, and print function information indicating a print function that can be set in each apparatus are associated. For example, the print server PS1 can output PDL data to a printer capable of interpreting PDL in RPCS format, allowing settings of all the print functions including "two-sided printing", "paper size", "color printing", "layout (N-up)", and "stapling". That is, the print server PS1 can create and output PDL data so as to allow the printer to execute the print functions during the printing process. The print server PS2 can output PDL data to a printer capable of interpreting PDL in PCL format. When the print server PS2 creates PDL data, only "two-sided", "color", and "layout" can be set as print conditions.

When the printer driver does not open an API operable from a program, only Win32API is available. Print functions available with Win32API are "paper orientation", "paper size", "the number of copies", "color printing", "two-sided printing" and the like, not including "layout" and "stapling". When a client has a printer driver, all the functions are available because the user manually sets a print function. However, when no printer driver is installed, those functions are not available in the printer.

Such print function information may be collected by the path detecting server 2 from the print servers PS1 and PS2 and the printers P1 and P2, and stored in the apparatus information database.

With the arrangement, in step S2 shown in FIG. 4, the path detecting server 2 finds a print processing path, referring to the apparatus information database and using the data format information and print function information shown in FIG. 15. For example, when the client 100 outputs to the printer P1, a print processing path is found that starts at the client 100 and ends at the printer P1 via the print server PS1. In this case, "two-sided printing", "paper size", "color printing", and "layout" can be set as print functions. When the client 100 outputs to the printer P2, a print processing path is found that starts at the client 100 and ends at the printer P2 via the print server PS2. In this case, "two-sided printing", "paper size", and "color printing" can be set as print functions. For example, when the printers PS1 and PS2 are equal in loading state, position, cost, and image quality, the printer PS1 has a higher capacity because more print functions can be set in the printer PS1.

When the client 101 outputs to the printer P1, a print processing path is found that starts at the client 101 and ends at the printer P1 via the print server PS1. In this case, "two-sided printing", "paper size", "color printing", and "layout" can be set as print functions. When the client 101 outputs to the printer P2, a print processing path is found that starts at the client 101 and ends at the path detecting server 2 via no print servers. In this case, "two-sided printing", "paper size", "color printing", "layout", and "stapling" can be set as print conditions. For example, when the printers PS1 and PS2 are equal in loading state, position, cost, and image quality, the printer PS2 has a higher capacity because more print functions can set in the printer PS2.

As such, even the same printer can provide to the client different print functions depending on print functions that can be set in each apparatus on the print processing path. Further, when the client specifies only "two-sided", "paper size", and "color printing" as print conditions, the path detecting server 2 may order a plurality of print processing paths thus found, according to print conditions that can be set for the print processing paths, and then rearrange the print processing paths so that a print processing path given with a higher order becomes a recommended path. Then, the path detecting server 2 may transmit to the client PC 1 path information indicating the print processing paths rearranged in this order.

In the first embodiment, for the client PC 1, a print processing path may be set previously, and path information indicating the print processing path may be associated with the client PC 1 and previously stored in the HDD of the path detecting server 2. As described, the identification name of an apparatus may be used to associate the path information indicating a print processing path with the client PC 1. In this case, the path detecting server 2, when it receives path request information from the client PC 1, reads the path information associated with the client PC 1 and stored in the HDD, and transmits it to the client PC 1.

According to some aspects of the present invention, a transmitting path can be found that is appropriate to perform a printing process according to print command data. This arrangement improves processing efficiency in the entire print processing system, realizing load-distributed processing in the print processing system According to another aspect of the present invention, an optimal transmitting path can be found concerning processing capability of each printer, processing cost required for the printing process, and image quality in the printing process.

According to still another aspect of the present invention, a transmitting path can be found that is appropriate for a printer or print conditions specified by the user. This arrangement improves user convenience.

According to still another aspect of the present invention, a printing process is realized by a printer that is more appropriate than another printer specified by the user. This arrangement improves user convenience, allowing a client PC to select a more appropriate printer.

According to still another aspect of the present invention, a printing process is realized by an appropriate printer that is closest to the client apparatus. This arrangement improves user convenience.

According to still another aspect of the present invention, determination can be made as to whether a printer specified by the user is appropriate to perform the printing process. This prevents a printer accidentally specified by the user from performing the printing process.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A path detecting server connected to a client apparatus and to one or more print servers via a network that relay print command data over the network to and from the client apparatus and one or more printers that perform a printing process according to the print command data, the path detecting server comprising:
a storage unit that stores therein first data format information that indicates a data format, which is processable by the printers, of the print command data, the storage unit also storing third data format information that indicates a data format, which is processable by the print servers, of the print command data;

a receiving unit that receives from the client apparatus second data format information that indicates a data format, which is processable by the client apparatus, of the print command data;

a selecting unit that selects, referring to the first data format information and the third data format information, a combination of a print server and a printer both capable of processing the print command data in the data format indicated in the second data format information, the combination being detected from among the print servers and the printers; and a path transmitting unit that transmits to the client apparatus path information indicating a transmitting path having the print server in selected combination as a relay point, and the printer in selected combination as a destination.

2. The path detecting server according to claim 1, wherein the path transmitting unit transmits to the client apparatus the path information including the third data format information about the print server in selected combination in correspondence to the second data format information about the client apparatus.

3. The path detecting server according to claim 1, further comprising:

an acquiring unit that acquires at least one of first capability information indicating a processing capability of the client apparatus, second capability information indicating a processing capability of each of the printers, and third capability information indicating a processing capability of each of the print servers; and the selecting unit selects, based on the first capability information, the second capability information, and the third capability information acquired by the acquiring unit, a transmitting path optimal to perform the printing process as the transmitting path from among a plurality of candidate transmitting paths, and the path transmitting unit transmitting to the client apparatus path information including the transmitting path selected by the selecting unit.

4. The path detecting server according to claim 3, wherein each of the first capability information, the second capability information, and the third capability information includes at least one of information about processing speed of and amount of load on the corresponding apparatuses.

5. The path detecting server according to claim 3, wherein the second capability information includes at least one information about processing cost for the printing process, image quality in the printing process, and a print function executable in the printing process.

6. The path detecting server according to claim 3, wherein the acquiring unit acquires the second function information including information of a print function executable by each of the printers in the printing process, the storage unit stores therein the second function information, the receiving unit receives print condition information indicating a print condition for the printing process, the selecting unit selects, referring to the second data format information stored and the second function information stored in the storage unit, a printer that is capable of processing the print command data in the data format indicated in the data format information received by the receiving unit, and that has a print function enabling execution of the printing process according to the print condition specified in the print condition information received by the receiving unit, and the path transmitting unit transmits to the client apparatus path information indicating a transmitting path destined for the printer having the print function and selected by the selecting unit.

7. The path detecting server according to claim 3, wherein the acquiring unit acquires first position information indicating a location of the client apparatus, and second position information indicating locations of the printers, the storage unit stores therein at least the second position information, the selecting unit selects a printer closest to the client apparatus, based on the second data format information, the first position information, and the second position information, and the path transmitting unit transmits to the client apparatus path information indicating a transmitting path destined for the printer selected by the selecting unit.

8. The path detecting server according to claim 1, wherein when at least one of transmitting paths between the client apparatus, the print server as a relay point, and the printer as a destination includes a plurality of transmission paths, the path transmitting unit transmits to the client apparatus path information indicating the transmitting paths arranged in an order according to a predetermined condition.

9. The path detecting server according to claim 8, wherein the receiving unit receives from the client apparatus condition information specifying the condition, and the path transmitting unit arranges the transmitting paths in an order according to the condition specified in the condition information.

10. The path detecting server according to claim 9, wherein the condition includes at least one of information about processing time required to perform the printing process according to the print command data sent through the transmitting paths, processing cost for the printing process, and image quality in the printing process.

11. The path detecting server according to claim 1, wherein the receiving unit receives printer specification information that specifies a printer to perform the printing process, and the path transmitting unit transmits to the client apparatus path information indicating a transmitting path to the printer specified in the printer specification information.

12. The path detecting server according to claim 11, further comprising an acquiring unit that acquires second capability information indicating a processing capability of each of the printers, wherein the storage unit stores therein the second capability information, the selecting unit selects, referring to the second capability information, another printer having a processing capability equivalent to that of the printer specified in the printer specification information, and the path transmitting unit transmitting to the client apparatus path information indicating a transmitting path destined for the another printer.

13. The path detecting server according to claim 11, wherein the path transmitting unit makes a determination as to whether the printer specified in the printer specification information is appropriate to perform the printing process according to the print command data, and transmits, when a result of the determination is negative, warning information indicating the result to the client apparatus.

14. The path detecting server according to claim 1, further comprising an acquiring unit that acquires at least one of first function information indicating a print function executable by each of the printers in the printing process, and second function information indicating a print function executable by each of the print servers in the printing process, the selecting unit selects, based on at least one of the first function information and the second function information, a transmitting path optimal to perform the printing process as the transmitting path from among a plurality of candidate transmitting paths.

15. The path detecting server according to claim 1, wherein the path transmitting unit transmits to the client apparatus the path information including information specifying the printer as the destination and information specifying the print server as the relay point.

16. The path detecting server according to claim 1, wherein the path transmitting unit transmits to the client apparatus a plurality of pieces of path information indicating transmitting paths for each of the printers.

17. A client apparatus that is connected via a network to one or more printers and one or more print servers that relay print command data indicating printing to and from the printers, and that transmits over the network the print command data, the client apparatus comprising:

a format transmitting unit that transmits over the network to a path detecting server second data format information indicating a data format, processable by the client apparatus, of the print command data;

a path receiving unit that receives path information from the path detecting server which indicates a transmitting path, the transmitting path having one of the printers as a destination and at least one of the print servers as a relay point both capable of processing the print command data in the data format indicated in the second data format information, the path information being sent from the path detecting server which selects the transmitting path in response to the second data format information, referring to first data format information indicating a data format, processable by the printers, of the print command data and third data format information indicating a data format, processable by the printer servers, of the print command data; and a command transmitting unit that transmits, to an apparatus specified as a relay point and placed subsequent to the client apparatus on the transmitting path indicated in the path information, path specification information including the print command data and information specifying another relay point subsequent to the relay point or the destination on the transmitting path.

18. The client apparatus according to claim 17, wherein the format transmitting unit transmits to the path detecting server first capability information indicating a processing capability of the client apparatus.

19. A path detection method comprising:

transmitting second data format information from a client apparatus to a path detecting server connected to the client apparatus and to one or more print servers via a network, the second data format information indicating a data format, processable by the client apparatus, of print command data indicating printing and being sent from the client apparatus via the network connecting to one or more printers;

receiving at the path detecting server the second data format information;

selecting at the path detecting server a combination of a print server and a printer, the combination being detected from among the print servers and the printers both capable of processing the print command data in the second data format by referring to first data format information and third data format information, the first data format information stored in a storage unit and indicating a data format, processable by the printers, of the print command data, and the third data format information stored in the storage unit and indicating a data format, processable by the print servers, of the print command data;

transmitting to the client apparatus, path information indicating a transmitting path having, as a relay point the print server in selected combination, and as a destination the printer in selected combination;

receiving at the client apparatus path information from the path detecting server along with the data format information and indicating a transmitting path having, as a relay point one, of the print servers and as a destination, one of the printers; and transmitting the print command data from the client apparatus to the printer serving as the destination on the transmitting path indicated in the path information.

* * * * *